(12) United States Patent
Morita et al.

(10) Patent No.: US 6,907,947 B2
(45) Date of Patent: Jun. 21, 2005

(54) POWER CONTROL UNIT FOR ELECTRIC VEHICLE

(75) Inventors: Hideki Morita, Saitama (JP); Tomoya Yamagishi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 137 days.

(21) Appl. No.: 10/198,815

(22) Filed: Jul. 18, 2002

(65) Prior Publication Data

US 2003/0034186 A1 Feb. 20, 2003

(30) Foreign Application Priority Data

Jul. 18, 2001 (JP) ........................................ 2001-217409
Jul. 12, 2002 (JP) ........................................ 2002-203536

(51) Int. Cl.[7] ............................. B60K 1/00; H05H 7/20
(52) U.S. Cl. ...................... 180/65.1; 180/301; 180/302; 361/699
(58) Field of Search .................. 180/65.1, 301, 180/302, 65.2; 165/185, 80.4; 361/699, 257, 704, 707, 710, 826, 827, 822, 823

(56) References Cited

U.S. PATENT DOCUMENTS

| | | | | | |
|---|---|---|---|---|---|
| 4,132,284 A | * | 1/1979 | Tomecek | ................. | 180/179 |
| 4,153,127 A | * | 5/1979 | Klink et al. | ............... | 180/65.1 |
| 4,288,728 A | * | 9/1981 | Niimi et al. | ................. | 318/139 |
| 4,387,325 A | * | 6/1983 | Klimo | ......................... | 318/71 |
| 4,557,225 A | * | 12/1985 | Sagues et al. | ........... | 123/41.31 |
| 4,602,694 A | * | 7/1986 | Weldin | ........................ | 180/2.2 |
| 4,626,962 A | * | 12/1986 | Ahn et al. | .................. | 361/758 |
| 4,698,562 A | * | 10/1987 | Gale et al. | .................. | 318/254 |
| 4,763,225 A | * | 8/1988 | Frenkel et al. | ............... | 361/709 |
| 4,773,494 A | * | 9/1988 | Anderson | ................... | 180/6.48 |
| 4,789,343 A | * | 12/1988 | Dougherty et al. | ............ | 439/34 |
| 4,899,256 A | * | 2/1990 | Sway-Tin | ................... | 361/715 |
| 5,012,656 A | * | 5/1991 | Tamura | ....................... | 62/498 |
| 5,461,542 A | * | 10/1995 | Kosak et al. | ............... | 361/710 |
| 5,504,655 A | * | 4/1996 | Underwood et al. | ........ | 361/707 |
| 5,510,658 A | * | 4/1996 | Nakayama | ................. | 307/10.1 |
| 5,533,905 A | * | 7/1996 | Hio et al. | .................. | 439/76.2 |
| 5,598,899 A | * | 2/1997 | Onodera et al. | ............ | 180/433 |
| 6,099,325 A | * | 8/2000 | Parkhill | ..................... | 439/76.1 |
| 6,313,991 B1 | * | 11/2001 | Nagashima et al. | ........ | 361/699 |
| 6,404,607 B1 | * | 6/2002 | Burgess et al. | ............... | 361/58 |
| 6,404,628 B1 | * | 6/2002 | Nagashima et al. | ........ | 361/690 |
| 6,408,240 B1 | * | 6/2002 | Morrell et al. | ................ | 701/82 |
| 6,560,115 B1 | * | 5/2003 | Wakabayashi et al. | ...... | 361/728 |
| 6,648,062 B2 | * | 11/2003 | Fukazu et al. | ............. | 165/80.3 |

FOREIGN PATENT DOCUMENTS

JP        2002-050527        2/2002

* cited by examiner

*Primary Examiner*—Paul N. Dickson
*Assistant Examiner*—Bridget Avery
(74) *Attorney, Agent, or Firm*—Lahive & Cockfield, LLP; Anthony A. Laurentano, Esq.

(57) ABSTRACT

A power control unit for electric vehicle which can easily detach the high voltage cables even if the motor room is deformed, for example, by head-on collision and/or rear-end collision of the vehicle, which is difficult to be deformed, which can make small, and which can avoid an influence of heat generated by the reactor is disclosed. The power control unit 1 includes a box 10 which accommodates devices for controlling electric power supply of the electric vehicle; a reactor receiver 11a which is provided on a given external surface around the box 10 and supports a reactor R; a heat sink 12 connected to the lower end of the reactor receiver 11a, covering the bottom surface of the box 10, possessing passages including passage wall inside thereof, and performing heat-exchange with the box 10 by allowing coolant water to flow within the passage; and a partition 13a, which is laid on at least one side of the box 10 extending toward the longitudinal direction of the vehicle EV, and is detachably communicated with cables to be connected to the traction motor 4 disposed below the heat sink 12 to supply power.

8 Claims, 8 Drawing Sheets

POWER CONTROL UNIT FOR ELECTRIC VEHICLE

BACKGROUND OF ARTS

1. Field of the Invention

The present invention relates to a power control unit for an electric vehicle, such as fuel cell electric vehicle, having a traction motor.

2. Description of the Related Arts

Due to discharge of no carbon dioxide gas, an electric vehicle has been focused which has batteries and a fuel cell and is driven by driving a motor for drive (hereinafter referred to as "traction motor"). The electric vehicle has a power control unit (hereinafter referred to as "PCU") for electric vehicle in addition to the batteries and the traction motor. For example, referring to FIG. 1, in the case of a fuel cell electric vehicle 100 (hereinafter simply referred to as "vehicle"), an inverter (hereinafter simply referred to as "PDU") to drive traction motor 104, a voltage control unit (hereinafter referred to as "VCU"), which controls the voltage between fuel cell 102 and capacitor 103 are accommodated within PCU 101.

In vehicle 101, fuel cell 102 and capacitor 103 are placed under the floor of the cabin, traction motor 104 is provided within a motor room, and PCU 101 is placed beneath traction motor 104, respectively (symbol W represents driving wheel and symbol S represents driving shaft, respectively). Between two of components, i.e., fuel cell 102, capacitor 103, traction motor 104, and PCU 101, are connected high voltage cables as shown by the block diagram of FIG. 2 in order to supply and receive electric power. Amongst high voltage cables, i.e., electric cables, a cable for connecting PCU 101 to fuel cell 2 is referred to as FC cable, a cable for connecting PCU 101 to capacitor 103 is referred to as CAPA cable, and a cable for connecting PCU 101 to traction motor 104 is referred to as MOT cable. It is noted that in order to the length of MOT cable is shortened whereby the loss of the electric power is minimized, PCU 101 is placed near traction motor 104.

Figure 11A:
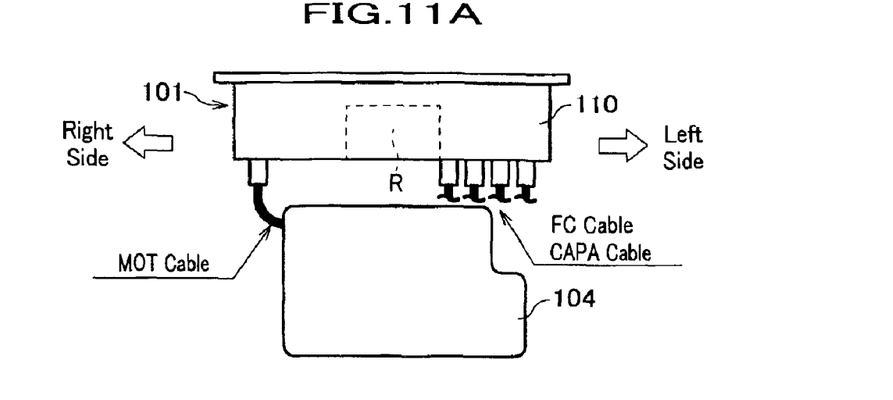
FIG. 11A is a schematic view of the conventional PCU and traction motor disposed within the motor room viewing from a front side (of vehicle)
Figure 11B:
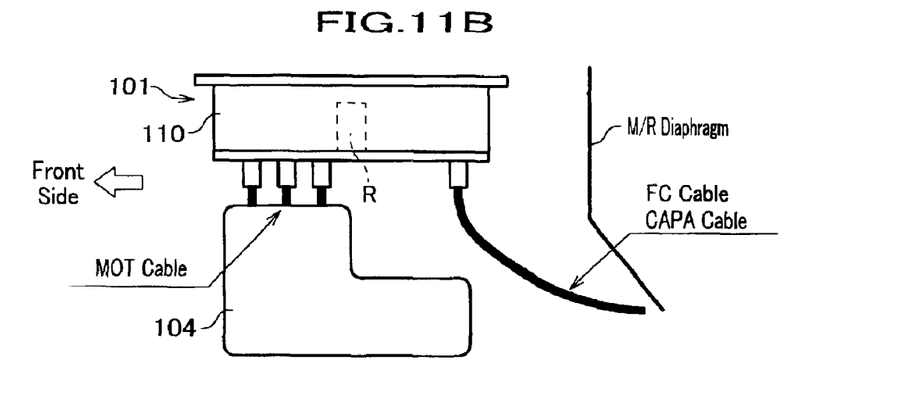
FIG. 11B is a schematic view of the conventional PCU and traction motor disposed within the motor room viewing from a left side (of vehicle)
Figure 11C:
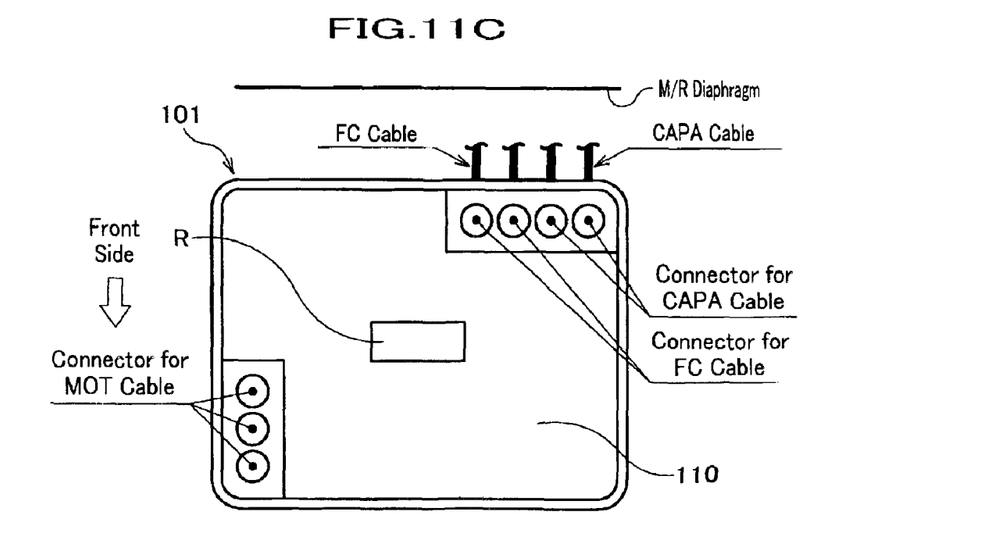
FIG. 11C is a schematic view of the conventional PCU disposed within the motor room viewing from an upper side (in the situation where devices possessed by PCU are omitted).

The high voltage cables within the motor room have hitherto had a layout as shown in FIG. 11. FIG. 11A is a schematic view of PCU and traction motor disposed within the motor room viewing from a front side (of vehicle), FIG. 11B is a schematic view of PCU and traction motor disposed within the motor room viewing from a left side (of vehicle), and FIG. 11C is a schematic view of PCU, viewing from an upper side (in the situation where devices accommodated within PCU are omitted).

As can been seen from these figures, FC cable and CAPA cable are passed through a portion of a diaphragm (hereinafter referred to as "M/R diaphragm") between traction motor 104 and motor room. The parts represented by symbol R is a reactor, which is an electric part functioning as a smoothing filter for noise reduction) accommodated within PCU 101.

If vehicle 100 is collided in a front or rear direction (i.e., head-on collision or rear-end collision), the motor room is sometimes crushed in the front or rear direction, causing deformation. This makes the gap between traction motor 104 and M/R diaphragm narrow, then making it difficult to detach FC cables and/or CAPA cables from PCU 101. Furthermore, FC cables and/or CAPA cables are caught into a space between traction motor 104 and M/R diaphragm, making it impossible to detach these cables. Such a situation then makes it impossible or difficult to perform maintenance with PCU 101 being detached. Consequently, a configuration is required in which the high voltage cables can be detached from the PCU 101 even if the motor room is deformed due to head-on and/or rear-end collision of vehicle. In the present situation, there takes a large gap between the traction motor 104 and M/R diaphragm. This, however, enlarges the wheelbase, improves the turning ability of vehicle 100 itself only with difficulty, and/or makes a cabin space small to thereby reducing livability. Also, in any case, depending upon the degree of deformation, FC cables and CAPA cables are caught in-between traction motor 104 and M/R diaphragm.

Since PCU 101 plays an important role in driving the vehicle, it should minimize the possibility of deforming box 101 against impact due to the collision to protect the functions of the devices accommodated within PCU 101 (box 110).

As for reactor R accommodated within PCU 101, upon supplying electric power, the surface of reactor R becomes high temperature due to Joule heat through the resistance of winding wires and Joule heat through the eddy current generated in the core. For this reason, electric parts and electronic parts are heated up through the radiant heat from reactor R, and have a fear of unstable actuation. If a space of the interior of PCU 101 (box 110) is enlarged in order to enhance ventilation so as to allow PCU 101 for effectively cooling, PCU 101 becomes large. However, it is not preferable from the functional viewpoint to dispose reactor R at a portion apart from PCU 101.

SUMMARY OF THE INVENTION

In light of the situation of the prior arts, the object of the present invention is to provide a power control unit for electric vehicle which can easily detach the high voltage cables even if the motor room is deformed, for example, by head-on collision and/or rear-end collision of the vehicle, which is difficult to be deformed, which can makes small, and which can avoid an influence of heat generated by the reactor.

According to the first aspect of the present invention which attain the object described above and other objects, there is provided a power control unit for an electric vehicle comprising: a box which accommodates devices for controlling electric power supply of said electric vehicle; a reactor receiver which is provided on a given external surface around said box and which supports a reactor; a heat sink, which is connected to the lower end of said reactor receiver, which covers the bottom surface of said box, which possesses passages comprising passage wall inside thereof, and which performs heat-exchange with said box by allowing coolant water to flow within said passage; and a beam member, which is laid on at least one side of said box extending toward the longitudinal direction of said vehicle, and which is detachably communicated with cables to be connected to the traction motor disposed below the heat sink to supply power.

In such a configuration, the devices for controlling electric power supply of said electric vehicle are accommodated within the box, while the reactor is supported on a given external wall surface of the box. Specifically, the reactor is provided outside of the box. For this reason, the radiant heat from the reactor or such is directed towards the outside of the box. The reactor receiver also serves as enhancing the rigidity. The heat sink, which covers the bottom surface of the box, has a function of enhancing the rigidity of the bottom of the box. Since the heat sink and the lower end of the reactor receiver are connected with each other, a force, for example, the force inputted to the reactor receiver, is distributed into the bottom surface of the box having been covered with the heat sink. Also, the beam member for communicating with the cables enhances the side (side wall) of the box. In addition, since the cables are communicated with the side of the box, cables can easily be disposed at the position where the traction motor residing at the lower portion of the heat sink (box) is avoided. In this case, the length of the cable does not become so long. Since the cables are communicated with the side of the box, the length of the box in the longitudinal direction can be shortened.

In a preferred embodiment of the power control unit as described above, the power control unit further comprises a second beam member, one end of which is fixed on the reactor receiver provided on a front portion or a rear portion of said vehicle, and the other end of which is fixed on the wall surface of the box extending longitudinally and facing to the reactor receiver in the longitudinal direction thereof.

In the power control unit according to this preferred embodiment, the box has the second beam member. One end of the second beam is fixed on the reactor receiver and the other end is fixed on the wall surface of the box extending longitudinally and facing to the reactor receiver in the longitudinal direction of the reactor receiver. Specifically, the second beam member is laid over the longitudinal direction of the box. This imparts the box to the rigidity against the force inputted to the longitudinal direction.

In a preferred embodiment of the power control unit as described above, a number of the wall surface components extending along the longitudinal direction the vehicle is larger than that perpendicular to the longitudinal direction of the vehicle.

In the power control unit according to this preferred embodiment, in the case where a, force is inputted to the longitudinal direction, the possibility of deforming the heat sink is reduced, improving the total rigidity of the box. The wall surface used herein dose not mean to distinguish the wall, ceiling, and floor from each other.

In a preferred embodiment of the power control unit as described above, a plurality of electric cables are arranged from the side of box toward the longitudinal direction of the vehicle, wherein parts of the electric cables are connected to a traction motor disposed below said box and having an outputting shaft directed toward the width direction of the vehicle, and the remaining parts of the electric cables are passed through the side portion at the side of non-outputting shaft of traction motor and arranged in such a manner that they extends towards the rear side of the vehicle.

In the power control unit according to this preferred embodiment, the portions taken out the electric cables (high voltage cables) are side portion of the traction motor. Consequently, even in the case of head-on collision and/or rear-end collision of the vehicle, which are the most frequent case of the collision of vehicle, the geometric arrangement of cables does not make narrow, and sufficient clearance of the cables can be ensured. Accordingly, the motor room can be shortened. This makes it possible to design the vehicle such that the total length of the vehicle body is shortened. In addition, the length of the cabin in the longitudinal direction can be also reduced.

The control unit having such a cable configuration is novel and unique. Consequently, the present invention can be extended to a power control unit for an electric vehicle comprising a box having devices for controlling power supply of the electric vehicle; and a plurality of electric cables arranged from the side of box toward the longitudinal direction of the vehicle, parts of which electric cables being connected to a traction motor disposed below said box and having an outputting shaft directed toward the width direction of the vehicle; wherein the remaining parts of the electric cables are passed through the side portion at the side of non-outputting shaft of traction motor and arranged in such a manner that they extends towards the rear side of the vehicle.

In the power control unit according to this preferred embodiment, the portions taken out the electric cables (high voltage cables) are side portion of the traction motor. Consequently, even in the case of head-on collision and/or rear-end collision of the vehicle, which are the most frequent case of the collision of vehicle, the geometric arrangement of cables does not make narrow, and sufficient clearance of the cables can be ensured. Accordingly, the motor room can be shortened. This makes it possible to design the vehicle such that the total length of the vehicle body is shortened. In addition, the length of the cabin in the longitudinal direction can be also reduced. In addition, the catching the electric cables into the space between the traction motor and the power supply device can be prevented, because the portions taken out the electric cables (high voltage cables) are side portion of the traction motor.

According to a preferred embodiment of the power control unit just mentioned, the electric cables extending toward the rear side of the vehicle are connected to a power supply apparatus disposed under the cabin of the vehicle.

In the power control unit according to this preferred embodiment, the portions taken out the electric cables (high voltage cables) are side portion of the traction motor. Consequently, even in the case of head-on collision and/or rear-end collision of the vehicle, which are the most frequent case of the collision of vehicle, the geometric arrangement of cables does not make narrow, and sufficient clearance of the cables can be ensured. Accordingly, the motor room can be shortened. This makes it possible to design the vehicle such that the total length of the vehicle body is shortened. In addition, the length of the cabin in the longitudinal direction can be also reduced. In addition, the catching the electric cables into the space between the traction motor and the power supply device can be prevented, because the portions taken out the electric cables (high voltage cables) are side portion of the traction motor.

BRIEF DESCRIPTION OF THE DRAWINGS

FIG. 6 is a plan view of PCU from which parts accommodated therein are omitted; wherein FIG. 6A schematically shows passages according to one embodiment of the present invention, and FIG. 6B schematically shows passages according to a comparative embodiment.

FIG. 8 is a schematic front view of vehicle having PCU of the present invention wherein

FIG. 10 is a drawing showing a variant embodiment of PCU where connector cases are provided on both sides of PCU box; in which

DESCRIPTION OF PREFERRED EMBODIMENTS

Embodiments of the present invention will now be described referring to the attached drawings.

Figure 1:
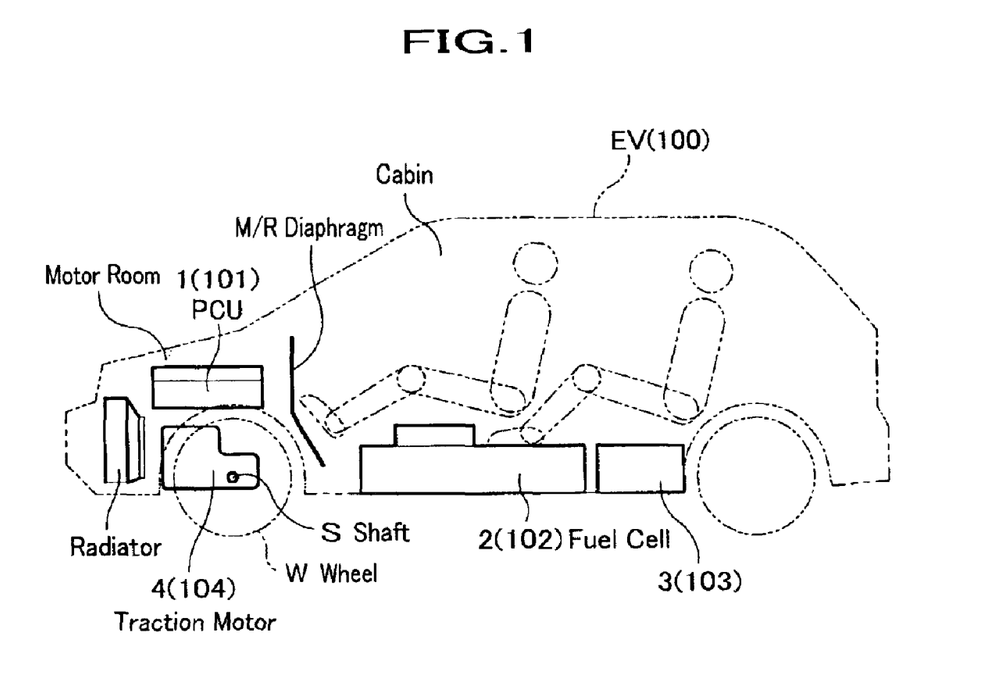
FIG. 1 is a schematically perspective side view of vehicle having PCU according to the present invention or the conventional PCU carried thereon.

The term "electric cables" or "high voltage cables" as used herein means to encompass all cables, which electrically connect PCU to any other devices. To be specific, in the following embodiments, the vehicle as shown in FIG. 1 and described in the column of the prior art is mainly explained, but the electric cables (high voltage cables) are not restricted to MOT cables, FC cables, and CAPA cables. For example, cables to be connected to any other storage, accumulator, or electric storage means for battery may be used instead of CAPA cable, and cables to be connected to any other power supply device such as a solar cell may be used instead of FC cable. These cables also be included in the electric cables (high voltage cables) used in the present invention. Specifically, the term electric storage means intended herein includes capacitors and batteries.

Also, the term "longitudinal direction" as used herein is intended to front and/or rear direction of vehicle, box, etc., while the width direction or traverse direction is intended to the right and/or left direction.

Figure 2:
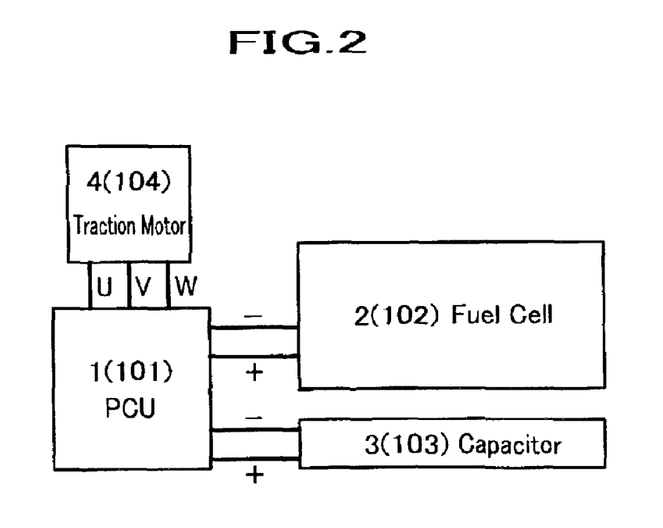
FIG. 2 is a block diagram showing the connection of high voltage cables of vehicle shown in FIG. 1.

As shown in FIG. 1, PCU (Power Control Unit) 1 according to this embodiment is placed (just) above traction motor 4 disposed within a motor room in front of vehicle EV. The reasons why PCU 1 is placed above traction motor 4 are that the longitudinal length of the motor room makes short and that the length of MOT cable makes short. A basic layout of respective components in vehicle EC according to this embodiment, i.e., the layout of PCU 1, fuel cell 2, capacitor 3, and traction motor 4, may be the same as or different from that in the prior art. Since FIG. 2 is commonly used, the situation of connecting each of high voltage cables between the respective components may be the same as that of the prior art.

Box 10, which is a body of PCU 1, is in a flat box from whose height is lower than the width and depth, and is made waterproofness. Box 10 has VCU for fuel cell 2, PDU for traction motor 4, an inverter for circulation of cooling water, an inverter for driving a supercharger or such (not shown) to make up PCU 1.

The layout of high voltage cables in the motor room will now be described.

Figure 3A:
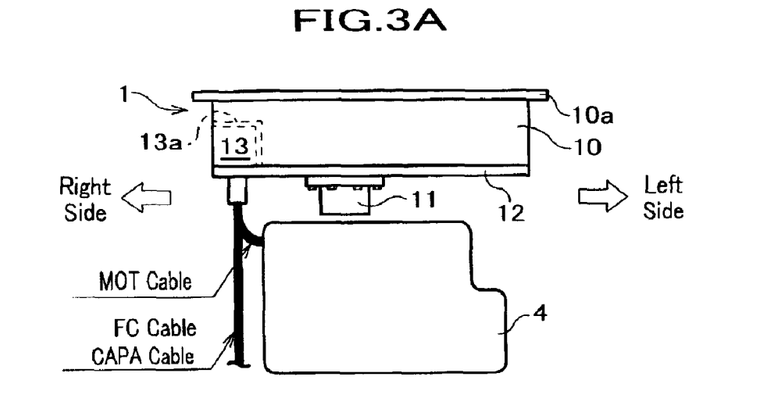
FIG. 3A is a schematic view of PCU placed within the motor room and the traction motor according to one embodiment of the present invention viewing from front (of vehicle)

As shown in FIG. 3A, PCU 1 has connector case 13 in the right side of the vehicle (left side in the figure). As shown in FIG. 3C, connector case 13 has three (three-phase) connectors for MOT cables, two (single-phase) connectors for CAPA cables, and two (single-phase) connectors for FC cables. Specifically, in PCU1 according to this embodiment, all of the high voltage cables are connected via connector case 13 provided on one side of PCU1, so that MOT cables and other electric cables can be detached at the portion of connector case 13.

Symbol 10a represents a cap of box 10, and symbol 13a represents a partition, which sections box 10 and produces connector case 13 on box 10, and which is in an L-shape in the cross section thereof. Partition 13a has a length over the front wall surface to the rear wall surface of box 10. It is noted that connectors for communicating MOT cables and the like are actually fitted to partition 13a in a detachable manner. Partition 13a corresponds to "a beam member, which is laid on at least one side of said box extending toward the longitudinal direction of said vehicle, and which is detachably communicated with cables to be connected to the traction motor disposed below the heat sink to supply power".

Figure 3B:
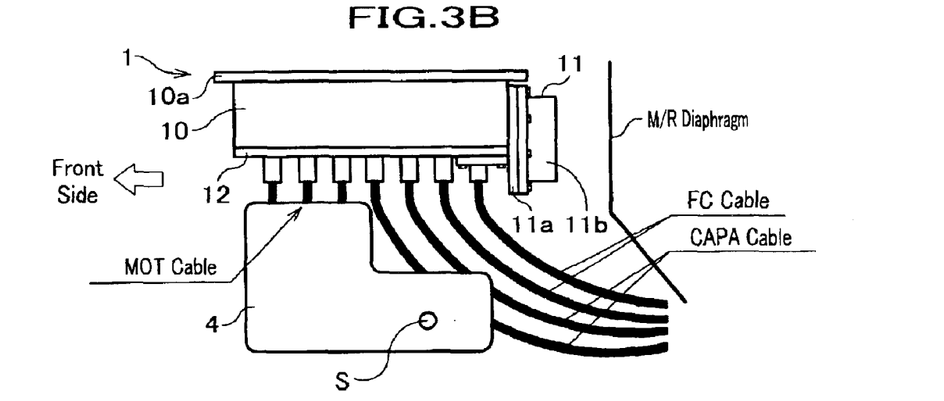
FIG. 3B is a schematic view of PCU placed within the motor room and the traction motor according to one embodiment of the present invention viewing from left side (of vehicle)
Figure 3C:
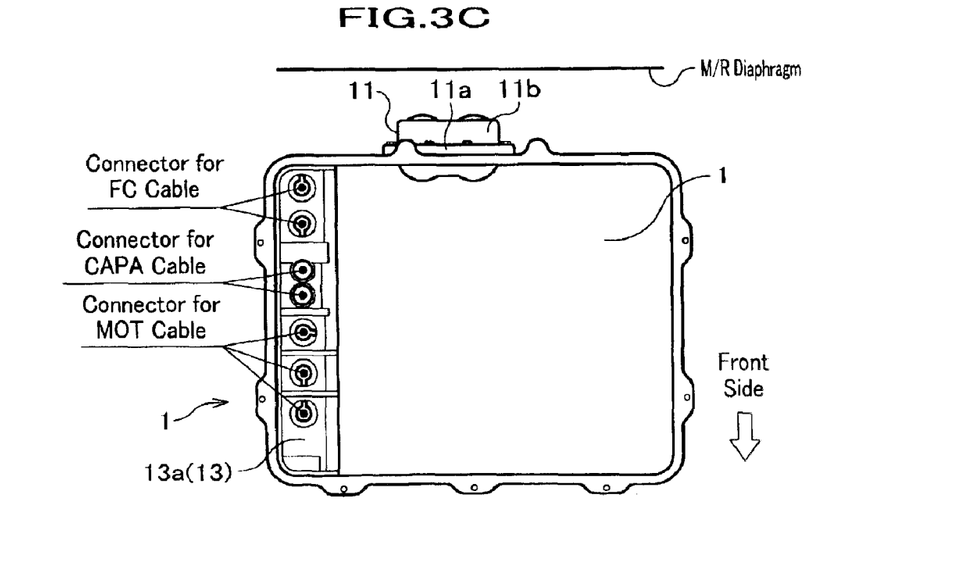
FIG. 3C is a schematic view of PCU disposed within the motor room according to one embodiment of the present invention viewing from an upper side (in the situation where devices possessed by PCU are omitted).

As shown in FIG. 3A and FIG. 3B, MOT cables downwardly extending from PCU 1 are connected to traction motor 4 just below PCU 1. Also, as shown in FIG. 3A and FIG. 3B, FC cables and CAPA cables hanging down from PCU 1 are passed through the right side (left side in the figures) of traction motor 4, extend backwards and are further passed through a lower portion of M/R diaphragm and are connected to fuel cell 2 and capacitor 3 respectively, as shown by the block diagram of FIG. 2.

As described above, MOT cables, FC cables and CAPA cables are evacuated or offset towards the right side (right side based on vehicle EV). This never makes any trouble in the operation of detaching cables from PCU 1, even if traction motor 4 and/or PCU 1 move backwards whereby the space between traction motor 4 and M/R diaphragm becomes narrow due to head-on collision and/or rear-end collision of vehicle EV or such. Also, even if traction motor 4 moves the motor room backwards in a complete manner, FC cables and CAPA cables are never caught in-between traction motor 4 and M/R diaphragm (see FIG. 3B). In this connection, PCU 1 according to this embodiment is distinguished from the prior art PCU 101 shown in FIG. 11.

As the high voltage cables like MOT cables are used high voltage electric cables for electric vehicle shielded with cross-linked polyethylene insulating braid comprising conductor (tin-plated soft copper wires) insulated with and protected by sheath (PVC). In this embodiment, the cross sectional area of conductor of CAPA cable is smaller than those of FC cable and MOT cable.

Next, reactor R will be described.

As shown in FIG. 3A and FIG. 3B, reactor case 11 composed of reactor receiver 11a and reactor cover 11b is provided on the external surface of PCU 1 at a rear side of vehicle EV. Specifically, in this embodiment reactor R is provided on the outside of PCU 1.

Figure 4:
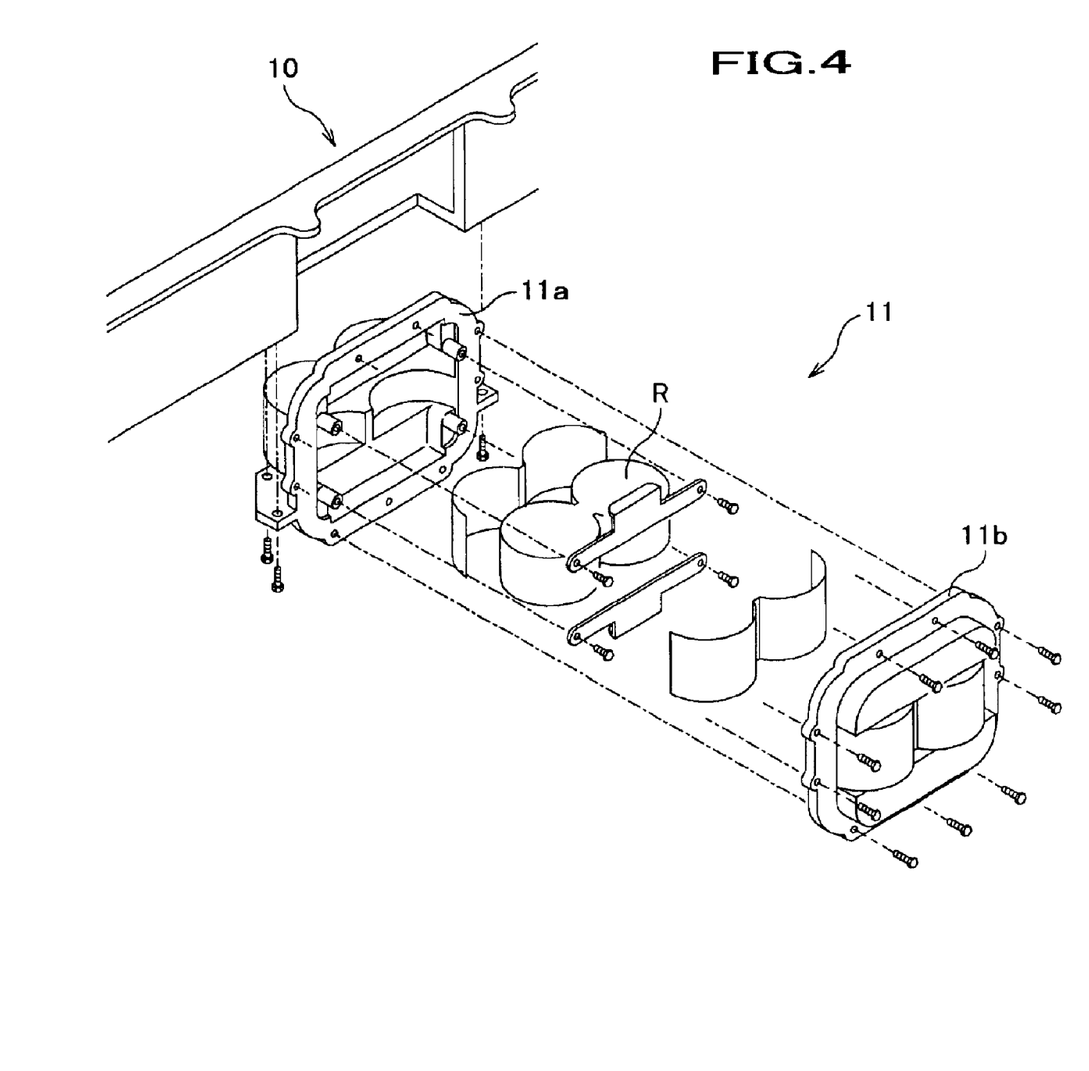
FIG. 4 is an explosively perspective view of reactor case according to one embodiment of the present invention.

As shown in FIG. 4, which is an explosively perspective view of reactor case 11, reactor R is accommodated within reactor case 11 having a water proofing property. As described in the column of the prior art, the surface of reactor R becomes high temperature due to Joule heat through the resistance of winding wires and Joule heat through the eddy current generated in the core. For this reason, reactor cover 11b or such is made of a highly heat-conductive material (such as aluminum) in order to enhance heat radiation.

As described above, by shifting the position of reactor R from the inside to the outside of PCU 1, the direction of the radiant heat from the surface of reactor R directed toward the inside of PCU 1 is changed toward the outside of PCU1. For this reason, the influence of heat upon devices within PCU 1 such as a device for controlling the power supply can be reduced. Also, this makes it easy to cool down reactor R itself.

Next, heat sink 12 will be described.

Figure 5:
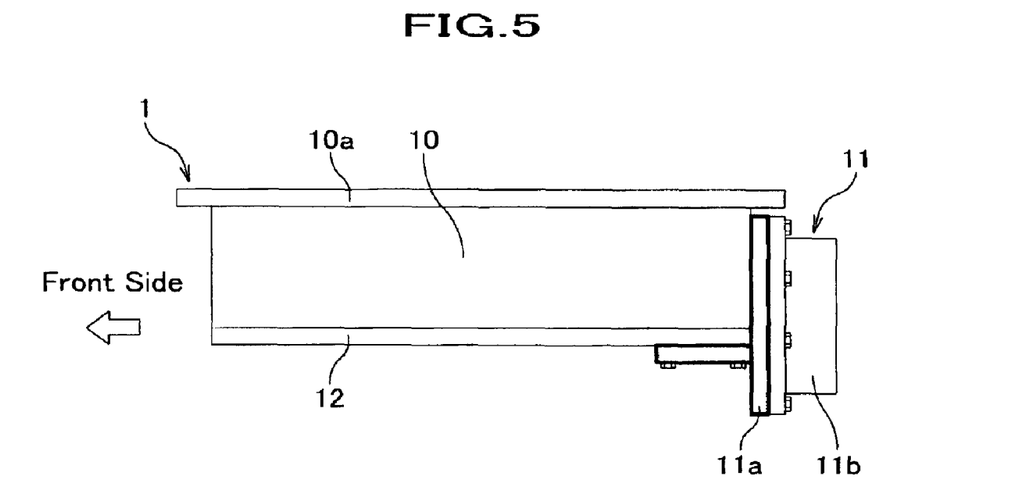
FIG. 5 is a front view of PCU according to one embodiment of the present invention.

As shown in FIG. 5 etc., heat sink 12 is provided on the bottom surface of PCU 1. Heat sink 12 covers the entire bottom surface of PCU 1 except for the portion of connector case 13, and has a passage (not shown) comprising inner passage walls. The cooling water flows within the passage to remove the heat generated by PDU and VCU within PCU 1. Specifically, heat sink 12 allows PCU1 to cool.

Next, the rigidity of PCU 1 (box 10) will be described.

Since PCU 1 is a part having important functions for vehicle EV, box 10 has rigidity sufficient to maintain the functions of PCU 1 even if vehicle EV is collided.

In this embodiment, box 10 is composed of molded product or a machined product so that box 10 has sufficient rigidity. Ribs (not shown) are provided on box 10 so as to prevent the wall surface of box 10 from being toppled inside of box 10 by the impact at the time of collision.

Reactor case 11 (reactor receiver 11a) shown in FIG. 4 etc. plays a role in enhancing the rigidity of box 10. Particularly, reactor receiver 11a has a substantially L shape viewing from side as shown in FIG. 5, and the projection of L-shape is overlapped with and connected to heat sink 12 (see bold portion of FIG. 5). As being described latter on, heat sink 12 has a function for enhancing the rigidity of the bottom surface of box 10. For this reason, reactor receiver 11a prevents reactor R (reactor case 11) from being toppled inward of box 10 by the impact at the time of head-on collision and/or rear-end collision of vehicle EV.

Figure 6A:
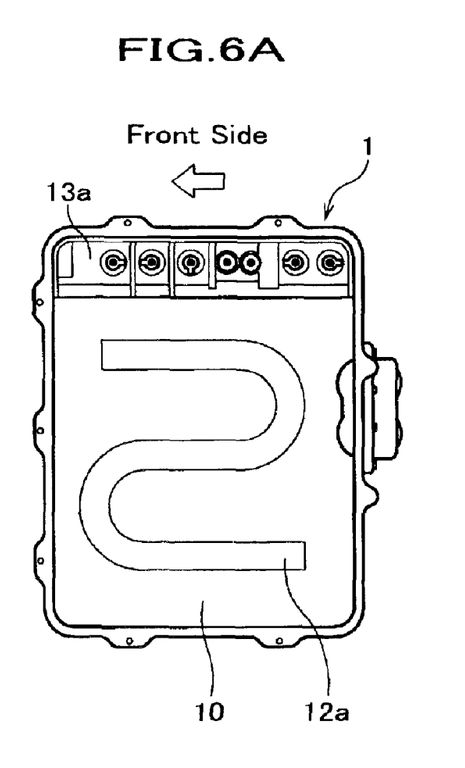
Figure 6B:
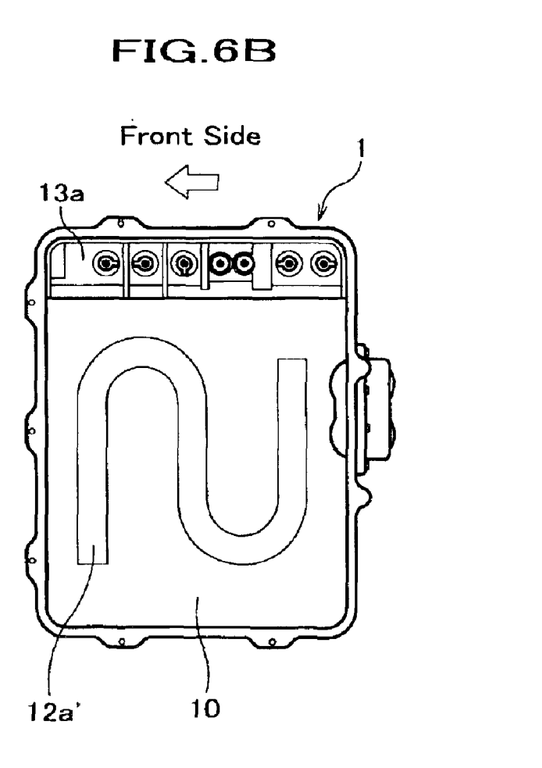

As shown FIG. 5, the bottom surface of box 10 is covered with heat sink 12 (except for the portion of connector case 12; see FIG. 3A), and heat sink 12 enhances the rigidity of the bottom surface of box 10. Furthermore, as schematically shown in FIG. 6A, the passage walls of passages provided within heat sink 12 are configured so that a number of the wall surface components extending along the longitudinal direction the vehicle EV is larger than that perpendicular to the longitudinal direction of the vehicle EV. Specifically, passage 12a is provided so that a number of the linear portions of passage 12a in the longitudinal direction of vehicle EV become large. In comparison with a configuration that a number of linear portion of passage 12a' in the traverse (width) direction of vehicle EV is large as shown in FIG. 6B, the passage walls according to the configuration of this embodiment has a function of preventing the deformation similar to the ribs described above. Consequently, this enhances the rigidity and makes it difficult to be deformed even if a force is applied to the longitudinal direction of box 10.

Also, as shown in FIG. 3A, FIG. 6A and the like, partition 13a which sections box 10 and produces connector case 13 on box 10 is provided over the wall surface from the front wall surface to the rear wall surface of box 10; enhancing the rigidity and making it difficult to be deformed even if a force is applied to the longitudinal direction of box 10.

As described above, according to PCU 1 of this embodiment where MOT cables, CAPA cables and FC cables are connected at one side portion of PCU 1, even if vehicle EV is collided from a front or rear direction (head-on or rear-end collision), whereby the motor room is deformed as to be compressed in the longitudinal direction, these cables can easily be detached. Also, in such a case, CAPA cables and FC cables are never caught in-between traction motor 4 and M/R diaphragm. For this reason, PCU 1 can be taken out, and then can easily be repaired. Furthermore, since MOT cables, CAPA cables and FC cables are connected at the side portion of PCU 1, the length of PCU 1 in the longitudinal direction can be shortened. To make PCU 1 small and to shorten the length of PCU 1 in the longitudinal direction can realize the miniaturization of motor room in vehicle EV and can ensure a sufficient space of the cabin of vehicle EV.

Also, according to PCU of this embodiment where reactor R is placed outside of box 10, PCU 10 has a reduced influence of heat upon devices possessed by PCU 10 in comparison with the prior art case where reactor R is placed inside of box 10. This can make PCU1 small, can reduce the load for cooling, and can easily perform the cooling of reactor R. To make PCU 1 small (and to shorten the length of PCU 1 in the longitudinal direction) can realize the miniaturization of motor room in vehicle EV and can ensure a sufficient space of the cabin of vehicle EV.

According to a preferred embodiment, since reactor receiver 11a in a L-shape in the cross section thereof is provided on the external surface of PCU 1 at a rear side of vehicle EV and since heat sink 12 and the lower end of reactor receiver 11a are overlapped with and connected to each other, the rigidity of box 10 against a force in the longitudinal direction can be further enhanced. For example, this can prevent the wall surface residing backward box 10 from being toppled within box 10. In addition to enhancing the rigidity of the bottom surface of box 10 by heat sink 12, since passage 12a is provided so that a number of the linear portions (wall surface components) of passage 12a in the longitudinal direction of vehicle EV become large, the rigidity of box 10 against a force in the longitudinal direction can be enhanced. Also, since partition 13a which sections box 10 and produces connector case 13 is provided on box 10, the rigidity of box 10 against a force in the longitudinal direction can be enhanced.

Figure 7:
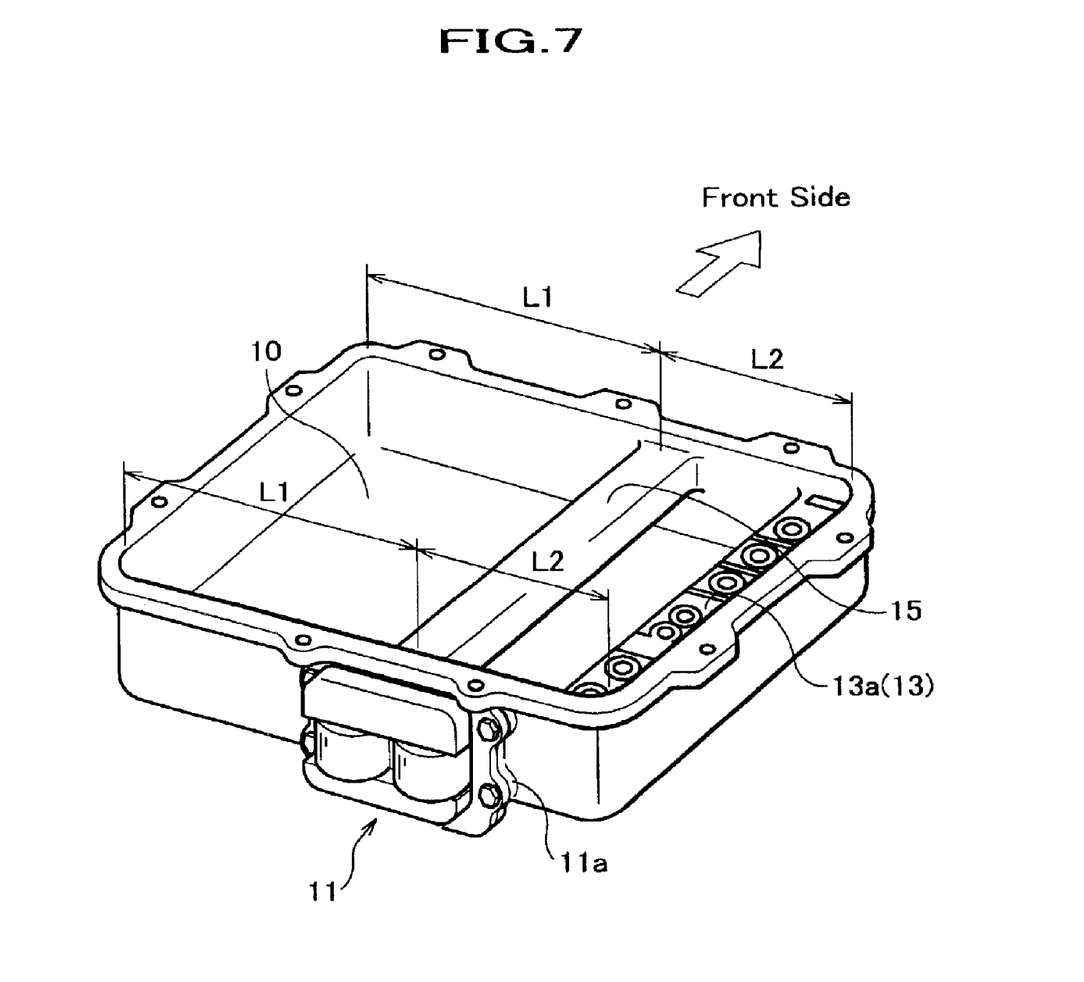
FIG. 7 is a perspective view showing an embodiment of PCU in which beams for enhancing rigidity against forces inputted to front or rear sides (in the state where parts accommodated therein are omitted).

Referring to FIG. 7, another embodiment of the present invention where the rigidity against a force in the longitudinal direction is enhanced (also see FIGS. 1 to 6). In this embodiment, elements and members common to those in the foregoing embodiments are referred to the same numbers and symbols, and their description will be omitted.

As shown in FIG. 7, box 10 has beam 15 with an angular shape of the cross section (such as laying U-shape, L-shape) inside thereof. Beam 15 is laid over box 10 in the longitudinal direction, one end of beam 15 is fixed on reactor receiver 11a, and the other end of beam 15 is fixed on a wall surface of box 10 at the front portion. Beam 15 used in this embodiment corresponds to "a second beam member, one end of which is fixed on the reactor receiver provided on a front portion or a rear portion of said vehicle, and the other end of which is fixed on the wall surface of the box extending longitudinally and facing to the reactor receiver in the longitudinal direction thereof".

According to this configuration, since beam 15 is connected to the front wall surface of box 10 and the rear wall surface (reactor receiver 11a), when vehicle EV is head-on or rear-end collided, the force inputted to box 10 in the longitudinal direction is distributed by beam 15 into the front and rear wall surfaces. Consequently, the wall surface of box 10 is deformed only with difficulty (i.e., increasing of the rigidity). Also, since the front and rear wall surfaces are sectioned into L1, L2 shown in FIG. 7 by beam 15 (corresponding to shortening the length of one side of wall surface), the wall surface of box 10 is difficult to be deformed in relation of moment (i.e., increasing of the rigidity). Beam 15 may also be provided on cap 10a.

Figure 8A:
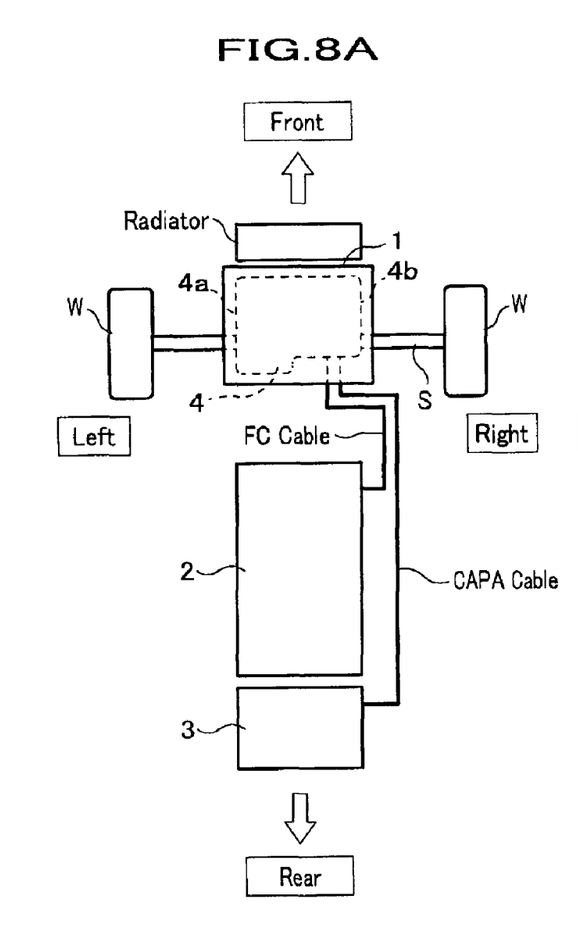
FIG. 8A shows a layout of electric conductive wires possessed by PCU according to one embodiment of the present invention.
Figure 8B:
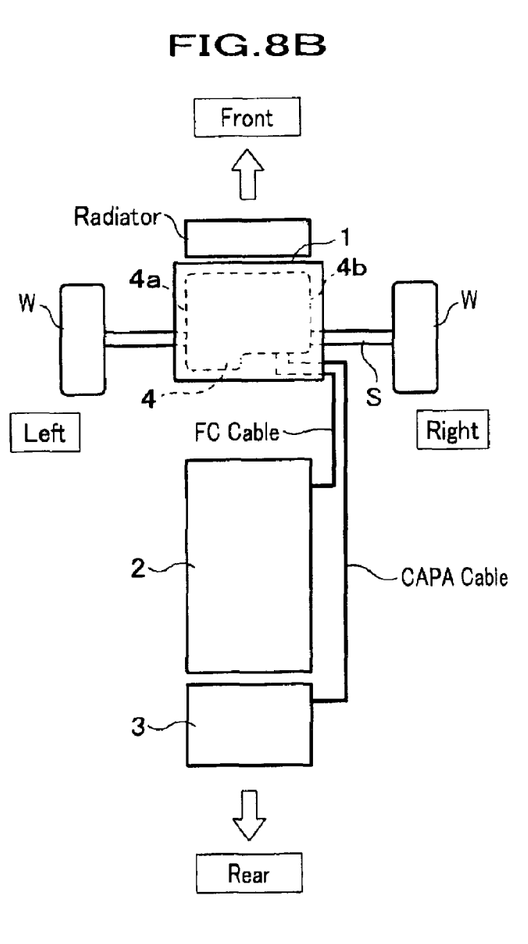
FIG. 8B shows a layout of electric conductive wires possessed by PCU according to another embodiment of the present invention.

Referring to FIG. 8, another embodiment of the present invention will now be described. FIG. 8 is a schematic front view of vehicle having PCU of the present invention and FIG. 8A and FIG. 8B each shows a layout of electric conductive wires possessed by PCU.

This embodiment focuses on the arrangement of electric cables, i.e., MOT cables, FC cables, and CAPA cables. However, those skilled in the art will appreciate that the present invention is not restricted to these specific electric cables and any modification can be made without departing from the scope of the present invention. In the following descriptions, FIG. 3 will be sometimes referred as occasion demands.

As shown in FIG. 3B, MOT cables, which are parts of electric cables, are connected to traction motor 4. FC cables and CAPA cables, which are the remaining electric cables, extend towards non-outputting shaft 4b of traction motor 4, respectively. Specifically, if these cables extend towards the side of outputting shaft 4a of traction motor 4, FC cables and CAPA cables may be interfered with each other.

In this particular embodiment, FC cables are connected to fuel cell 2 shown in FIGS. 8A and 8B, while CAPA cables are passed through the side of fuel cell 2 (right side in FIGS. 8A and 8B), and then connected to capacitor 3.

As shown in FIG. 3B, since FC cables and CAPA cables hung down slightly backward shaft S, these cables are not interfered with shaft S.

As shown in FIG. 8A, FC cables and CAPA cables are passed from the rear side of PCU 1 (shown by broken line in this figure) through a part of space between traction motor 4 and fuel cell 2, then through the side portion of fuel cell 2, and connected to fuel cell 2 and capacitor 3, respectively.

According to this configuration, FC cables and CAPA cables only present in a small part of the space between traction motor 4 and fuel cell 2 (at the rear side of traction motor 4). For this reason, it is possible to ensure a sufficient space between traction motor 4 and fuel cell 2.

Consequently, even in case where vehicle EV is head-on or rear-end collided to decrease the space between traction motor 4 and fuel cell 2, the arrangement of the electric cables shown in FIG. 8 can prevent these electric cables from being caught in-between traction motor 4 and fuel cell 2. Since it becomes possible to ensure a sufficient clearance between traction motor 4 and fuel cell 2, the length of the motor room can be decreased. Furthermore, this makes it possible to design vehicle in the state where total length of vehicle is shortened, and the length of cabin can also be increased even if the total length of vehicle is not shortened.

In another preferred embodiment, the electric cables can be arranged as shown in FIG. 8. Specifically, FC cables and CAPA cables extending downward the PCU 1 can be extended to the side direction of non-outputting shaft 4b of traction motor 4, then passed through the side portion of fuel cell 2, and connected to fuel cell 2 and capacitor 3, respectively. In arranging the electric cables as shown in FIG. 8B, those skilled in the arts will appreciate that FC cables and CAPA cables should be arranged in such a manner that these electric cables are not interfered with a wheel house (not shown) existing between the non-outputting side 4b of traction motor 4 and wheel S.

According to such a configuration, even in case where vehicle EV is head on or rear-end collided or such and where traction motor 4 is backed within the motor room, since no electric cable (FC cable and CAPA cable) presents between the motor room and fuel cell 2, the electric cables can be prevented from being caught in-between traction motor 4 and fuel cell 2. Furthermore, in this embodiment, the length of the motor room can be decreased. Furthermore, this makes it possible to design vehicle in the state where total length of vehicle is shortened, and the length of cabin can also be increased even if the total length of vehicle is not shortened.

The embodiment as shown in FIG. 8A and FIG. 8B where parts of electric cables (MOT cables) amongst a plurality of electric cables arranged from the side of PCU1 toward the longitudinal direction of vehicle EV are connected to traction motor 4 and the remaining parts of electric cables (FC cables and CAPA cables) are passed through the side of non-outputting shaft 4b of traction motor 4 and arranged in such a manner that they extends backwardly, and particularly the embodiment where FC cables which are parts of the electric cables are connected to fuel cell disposed below the cabin of the vehicle is novel, irreverent to the configuration of PCU according to the present invention, and such embodiments can be applied to a generic PCU for an electric vehicle EV.

Specifically, the present invention encompasses a power control unit for an electric vehicle comprising a box having devices for controlling power supply of the electric vehicle; and a plurality of electric cables arranged from the side of box toward the longitudinal direction of the vehicle, parts of which electric cables being connected to a traction motor disposed below said box and having an outputting shaft directed toward the width direction of the vehicle; wherein the remaining parts of the electric cables are passed through the side portion at the side of non-outputting shaft of traction motor and arranged in such a manner that they extends towards the rear side of the vehicle.

In addition, it should be understood that the present invention is not restricted to the foregoing embodiments and various variant and modification can be made without departing from the scope and the spirits of the present invention.

Figure 9:
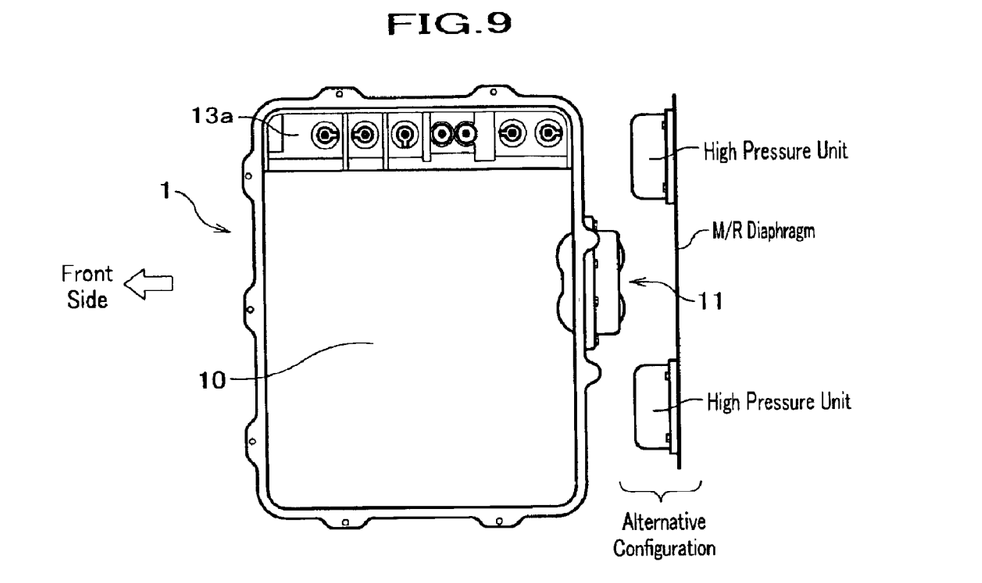
FIG. 9 is a plan view showing an variant embodiment where a receiver construction is provided on M/R diaphragm.

For example, an alternative configuration that avoids the contact with projections of reactor case may be provided on M/R diaphragm shown in FIG. 9. In this configuration, in the case of the deformation of the motor room in the longitudinal direction, even if PCU 1 and M/R diaphragm are close to each other, due to gained stroke, reactor case 11 can be prevented from being in contact with any other members. Also, the alternative configuration may be set, for example, so as to have a distance and depth sufficient for storing reactor case 11. Also, the alternative configuration may be composed of two high-pressure units each having a prescribed thickness provided at a prescribed interval as shown in FIG. 9.

Figure 10A:
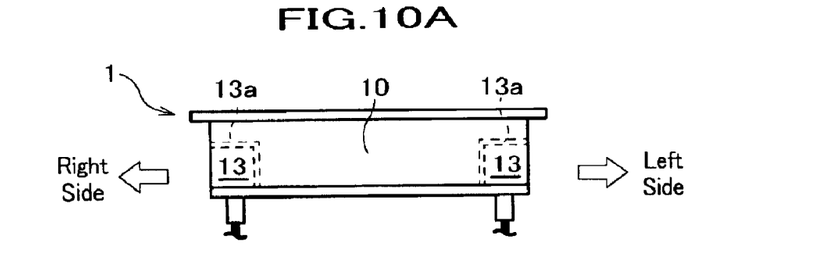
FIG. 10A shows a front of PCU and FIG. 10B is a plane view of PCU (in the state where parts accommodated therein are omitted).
Figure 10B:
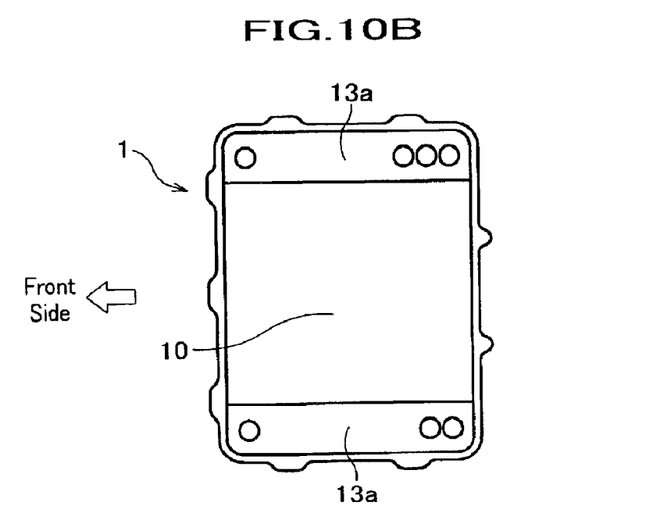

In addition, as shown in FIG. 10 it is also possible to provide connector cases 13 on both sides of box 10 to thereby further enhance the rigidity of box 10 against forces inputted to front or rear sides.

Also, reactor R may also be provided on the rear side, as well as a side or front side.

Furthermore, it is not necessary that reactor receiver 11a is in substantially an L-shape to be overlapped with heat sink 12, because the force inputted to reactor receiver 11a can be distributed only when they are in contact with each other (even if they are not overlapped with each other).

Also, while the embodiments that the present invention is applied to applied to fuel cell electric vehicle, the present invention may be applied to any of other electric vehicles including generic electric vehicles and hybridized car having an engine, a traction motor, and a buttery. In such a case, FC cables to be connected to fuel cell 2 are omitted and the electric cables are composed of MOT cables, CAPA cables.

The present invention is not restricted to specific means and method for fixing PCU 1 in the motor room.

Also, it is within the scope of the present invention that a passage as shown in FIG. 6B is provided.

What is claimed is:

1. A power control unit for an electric vehicle comprising:
   a box which accommodates devices for controlling an electric power supply of said electric vehicle;
   a reactor receiver which is provided on a given external surface around said box and which supports a reactor;

a heat sink, which is connected to a lower end of said reactor receiver, which covers a bottom surface of said box, which possesses passages comprising a passage wall inside thereof, and which performs heat-exchange with said box by allowing coolant water to flow within said passage; and a beam member, which is laid on at least one side of said box extending toward a longitudinal direction of said vehicle, and which is detachably communicated with cables to be connected to the traction motor disposed below the heat sink to supply power.

2. The power control unit according to claim 1, which further comprises a second beam member, one end of which is fixed on the reactor receiver provided on a front portion or a rear portion of said vehicle, and the other end of which is fixed on a wall surface of the box extending longitudinally and facing the reactor receiver in the longitudinal direction thereof.

3. The power control unit according to claim 1, wherein a number of wall surface components extending along the longitudinal direction of the vehicle is larger than a perpendicular to the longitudinal direction of the vehicle.

4. The power control unit according to claim 1, wherein a plurality of electric cables are arranged from a side of the box toward the longitudinal direction of the vehicle, wherein a first set of the electric cables are connected to a traction motor disposed below said box and having an outputting shaft directed toward a width direction of the vehicle, and a second set of the electric cables are passed through a side portion at a side of non-outputting shaft of the traction motor and arranged in such a manner that they extend towards a rear side of the vehicle.

5. The power control unit according to claim 2, wherein a number of wall surface components extending along the longitudinal direction of the vehicle is larger than a perpendicular to the longitudinal direction of the vehicle.

6. The power control unit according to claim 4, wherein said second set of the electric cables pass through the side portion at the side of non-outputting shaft of the traction motor and are arranged in such a manner that they extend towards the rear side of the vehicle, so that a first portion of said second set of the electric cables can be connected to a power supply apparatus and a second portion of the second set of the electric cables can be connected to a battery means.

7. The power control unit according to claim 4, which comprises a connector case or connecter cases having connectors for connecting said electric cables provided on one sides or both sides of said box.

8. The power control unit according to claim 6, wherein said power supply apparatus comprises a fuel cell and said battery means comprises a capacitor.

* * * * *